(12) United States Patent
Sajassi

(10) Patent No.: US 7,835,370 B2
(45) Date of Patent: Nov. 16, 2010

(54) SYSTEM AND METHOD FOR DSL SUBSCRIBER IDENTIFICATION OVER ETHERNET NETWORK

(75) Inventor: Ali Sajassi, Concord, CA (US)

(73) Assignee: Cisco Technology, Inc., San Jose, CA (US)

( * ) Notice: Subject to any disclaimer, the term of this patent is extended or adjusted under 35 U.S.C. 154(b) by 1104 days.

(21) Appl. No.: 11/117,017

(22) Filed: Apr. 28, 2005

(65) Prior Publication Data

US 2006/0245439 A1  Nov. 2, 2006

(51) Int. Cl.
*H04L 12/28* (2006.01)
*H04J 3/16* (2006.01)

(52) U.S. Cl. ............... 370/401; 370/392; 370/397; 370/399; 370/409; 370/471

(58) Field of Classification Search .......... 370/349, 370/392, 389, 397, 399, 395.53, 395.42, 370/395.43, 395, 3, 409, 471
See application file for complete search history.

(56) References Cited

U.S. PATENT DOCUMENTS

| | | | |
|---|---|---|---|
| 5,331,637 A | 7/1994 | Francis et al. | |
| 5,818,842 A | 10/1998 | Burwell et al. | |
| 5,848,277 A | 12/1998 | Sheu | |
| 6,055,364 A | 4/2000 | Speakman et al. | |
| 6,078,590 A | 6/2000 | Farinacci et al. | |
| 6,188,694 B1 | 2/2001 | Fine et al. | |
| 6,301,244 B1 | 10/2001 | Huang et al. | |
| 6,304,575 B1 | 10/2001 | Carroll et al. | |
| 6,308,282 B1 | 10/2001 | Huang | |
| 6,424,657 B1 * | 7/2002 | Voit et al. | 370/412 |
| 6,430,621 B1 | 8/2002 | Srikanth et al. | |
| 6,484,209 B1 | 11/2002 | Momirov | |

(Continued)

FOREIGN PATENT DOCUMENTS

EP  1 933 506 A  6/2008

(Continued)

OTHER PUBLICATIONS

<URL:http://www.e.kth.se/~e95_pla/exjobb/doc/Lahti_Thesis_QoS_in_PPPoE.pdf>) Oct. 1, 2000.

(Continued)

*Primary Examiner*—Daniel J Ryman
*Assistant Examiner*—Thinh D Tran
(74) *Attorney, Agent, or Firm*—The Law Offices of Bradley J. Bereznak

(57) ABSTRACT

A DSLAM aggregation topology VLAN bundling mechanism includes an edge device port that receives a packet from a Digital Subscriber Line Access Multiplexer (DSLAM) device, the packet including an inner Virtual Local Area Network (VLAN) tag that identifies a Digital Subscriber Line (DSL) subscriber. A processor of the edge device adds an outer VLAN tag to the packet, the outer VLAN tag identifying the DSLAM and a destination server coupled to an Ethernet access network. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

14 Claims, 4 Drawing Sheets

U.S. PATENT DOCUMENTS

| | | |
|---|---|---|
| 6,502,140 B1 | 12/2002 | Boivie |
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,757,286 B1 | 6/2004 | Stone |
| 6,763,469 B1 | 7/2004 | Daniely |
| 6,789,121 B2 | 9/2004 | Lamberton et al. |
| 6,798,775 B1 * | 9/2004 | Bordonaro et al. ......... 370/392 |
| 6,801,533 B1 | 10/2004 | Barkley |
| 6,807,179 B1 * | 10/2004 | Kanuri et al. ......... 370/395.31 |
| 6,826,698 B1 | 11/2004 | Minkin et al. |
| 6,839,348 B2 | 1/2005 | Tang et al. |
| 6,850,542 B2 | 2/2005 | Tzeng |
| 6,882,643 B1 | 4/2005 | Mauger et al. |
| 6,892,309 B2 | 5/2005 | Richmond et al. |
| 7,009,983 B2 | 3/2006 | Mancour |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 | 10/2007 | Frietsch |
| 7,310,342 B2 | 12/2007 | Rouleau |
| 7,408,936 B2 * | 8/2008 | Ge et al. ......... 370/392 |
| 7,466,703 B1 | 12/2008 | Arunachalam et al. |
| 2002/0032780 A1 | 3/2002 | Moore et al. |
| 2002/0087721 A1 | 7/2002 | Sato et al. |
| 2002/0156612 A1 | 10/2002 | Schulter et al. |
| 2002/0196795 A1 | 12/2002 | Higashiyama |
| 2003/0012183 A1 | 1/2003 | Butler |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0174729 A1 * | 9/2003 | Heink et al. ......... 370/466 |
| 2003/0177221 A1 | 9/2003 | Ould-Brahim et al. |
| 2004/0044789 A1 * | 3/2004 | Angel et al. ......... 709/238 |
| 2004/0095940 A1 | 5/2004 | Yuan et al. |
| 2004/0102182 A1 | 5/2004 | Reith et al. |
| 2004/0107382 A1 | 6/2004 | Doverspike et al. |
| 2004/0125809 A1 | 7/2004 | Jeng |
| 2004/0133619 A1 | 7/2004 | Zelig et al. |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0213237 A1 * | 10/2004 | Yasue et al. ......... 370/392 |
| 2004/0228291 A1 | 11/2004 | Huslak et al. |
| 2004/0233891 A1 | 11/2004 | Regan |
| 2004/0264364 A1 | 12/2004 | Sato |
| 2005/0007951 A1 | 1/2005 | Lapuh et al. |
| 2005/0025143 A1 * | 2/2005 | Chen et al. ......... 370/389 |
| 2005/0030975 A1 * | 2/2005 | Wright et al. ......... 370/468 |
| 2005/0044265 A1 | 2/2005 | Vinel et al. |
| 2005/0063397 A1 | 3/2005 | Wu et al. |
| 2005/0068972 A1 | 3/2005 | Burns et al. |
| 2005/0099949 A1 | 5/2005 | Mohan et al. |
| 2005/0152370 A1 | 7/2005 | Meehan et al. |
| 2005/0157664 A1 * | 7/2005 | Baum et al. ......... 370/256 |
| 2005/0157751 A1 * | 7/2005 | Rabie et al. ......... 370/466 |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0239445 A1 | 10/2005 | Karaogguz et al. |
| 2005/0249124 A1 | 11/2005 | Elie-Dit-Cosaque et al. |
| 2005/0286503 A1 | 12/2005 | Oda et al. |
| 2006/0007867 A1 | 1/2006 | Elie-Dit-Cosaque et al. |
| 2006/0092847 A1 | 5/2006 | Mohan et al. |
| 2006/0098607 A1 | 5/2006 | Zeng |
| 2006/0159008 A1 * | 7/2006 | Sridhar et al. ......... 370/216 |
| 2006/0182037 A1 | 8/2006 | Chen et al. |
| 2006/0248277 A1 | 11/2006 | Pande |
| 2006/0285501 A1 | 12/2006 | Damm |

FOREIGN PATENT DOCUMENTS

| | | |
|---|---|---|
| WO | WO 2008/089370 | 7/2008 |

OTHER PUBLICATIONS

Do-Wire Edge-To Edge (PWE3) Working Group, Simon Delord, UECOMM; Philippe Niger, France Telecom; Yuichi Ikejiri, Yuichiro Wada, NTT Debor: "PWE3 Applications & OAM Scenarios; draft-delord-pwe3-oam-applications 02.txt" Standard-Working-Draft, Internet Engineering Task Force, IETF, CH, No. 2, Oct. 1, 2005 XP015042128 ISSN: 0000-0004 abstract p. 10, paragraph 3 Section 3.1.1.1. on pp. 12-13; http://ftp.ist.utl.pt/pub/drafts/draft-delord-pwe3-oam-applications-02.txt.

Blunk et al. Draft RFC 2284—Extensible Authentication Protocol EAP, Feb. 2004; http://tools.ietf.org/html/draft-ietf-eap-rfc2284bis-09.

Light Reading, Inc., Distributed-Edge Artecture, Nov. 25, 2003.

Landron, Use of the IEEE Assigned Type Field with IEEE std 802.3, 1998 Edition Local and Metropolian Area Networks, Apr. 16, 2004.

Marc Lasserre et al., "Virtual Private LAN Services over MPLS", Mar. 2003, Internet Draft Document, pp. 4-22.

Wolfe, [dhcwg] Publication of draft-droms-agentopt-8021x-00.txt, Nov. 22, 2001, IETF.

Cisco, Delivering Multicast Vidoe over Asymmetric Digital Subscriber Line, 1999, Cisco.

Flannagan et al., Cisco Catalyst QoS; Quality of Service in Campus Networks, Jun. 6, 2003, Cisco Press, chapter 8, section 4.

* cited by examiner

SYSTEM AND METHOD FOR DSL SUBSCRIBER IDENTIFICATION OVER ETHERNET NETWORK

RELATED APPLICATIONS

The present application is related to co-pending application Ser. Nos. 11/117,016 filed Apr. 28, 2005, entitled, "Metro Ethernet Network With Scaled Broadcast And Service Instance Domains"; 11/117,250 filed Apr. 28, 2005, entitled, "A Comprehensive Model For VPLS"; and 11/117,249 filed Apr. 28, 2005, entitled, "Scalable System And Method For DSL Subscriber Traffic Over An Ethernet Network", which applications are assigned to the assignee of the present application.

FIELD OF THE INVENTION

The present invention relates generally to data communications systems; more specifically, to subscriber access and communications over a high-speed network.

BACKGROUND OF THE INVENTION

Digital Subscriber Line (DSL) technology is widely-used today for increasing the bandwidth of digital data transmissions over the existing telephone network infrastructure. In a typical system configuration, a plurality of DSL subscribers are connected to a service provider (SP) network through a Digital Subscriber Line Access Multiplexer (DSLAM), which concentrates and multiplexes signals at the telephone service provider location to the broader wide area network. Basically, a DSLAM takes connections from many customers or subscribers and aggregates them onto a single, high-capacity connection. The DSLAM may also provide additional functions such as routing or Internet Protocol (IP) address assignment for the subscribers.

Asynchronous Transfer Mode (ATM) protocol networks have traditionally been utilized for communications between DSLAM devices and web feature servers such as Broadband Remote Access Servers (BRAS) and Layer 3 Virtual Private Network (L3VPN) servers. A BRAS is a device that terminates remote users at the corporate network or Internet users at the Internet service provider (ISP) network, and commonly provides firewall, authentication, and routing services for remote users. The ATM protocol is an international standard in which multiple service types (such as voice, video, or data) are conveyed in fixed-length "cells" over point-to-point network connections. ATM networks need a virtual circuit (VC) to be set up across the network before data transfer may occur. That is, communication between a subscriber and a feature server requires allocation of a separate VC. Data packet cells travel through the ATM switches from the user network interface (UNI) to the network node interface (NNI) through a process called Virtual Path Identifier/Virtual Channel Identifier (VP/VCI) translation. The VPI/VCI identifiers are used by the ATM switches to switch/direct the subscriber traffic to a given feature server, and in the reverse direction to forward server traffic to a given DSLAM/subscriber, without ambiguity. Furthermore, the VPI/VCI mechanism is used by the feature server to identify the subscriber. By way of background, U.S. Pat. No. 6,801,533 teaches a system and method for proxy signaling in a DSLAM and generally describes a DSL network that includes communication transfer of signals from a DSLAM to a remote access server over a high-speed ATM network. Transmission of packet data over an ATM network is also taught in U.S. Pat. No. 6,785,232.

Ethernet is a technology that originated based on the idea of peers on a network sending messages in what was essentially a common wire or channel. Each peer has a globally unique key, known as the Media Access Control (MAC) address to ensure that all systems in an Ethernet have distinct addresses. Most modern Ethernet installations use Ethernet switches (also referred to as "bridges") to implement an Ethernet "cloud" or "island" that provides connectivity to the attached devices. The switch functions as an intelligent data traffic forwarder in which frames are sent to ports where the destination device is attached. Examples of network switches for use in Ethernet network environments are found in U.S. Pat. Nos. 6,850,542, 6,813,268 and 6,850,521.

As the use of Ethernet has become more widespread, researchers and service providers have developed a variety of methods and systems for data transmission using Ethernet technology. For example, U.S. Pat. No. 6,829,252 teaches a DSLAM device that incorporates a means of transporting Ethernet frame data over a very high-speed DSL (VDSL) transport facility. According to this approach, Ethernet frames are encapsulated within High-Level Data Link Control (HDLC) protocol formatted VDSL frames, which are then transmitted over a plurality of point-to-point links to customer sites. Ethernet-based DSL methods and systems are also described in U.S. Pat. No. 6,785,265.

The proliferation of Ethernet has also led service providers to seek ways of using Ethernet access network technology instead of ATM network technology to connect and aggregate DSLAM traffic to BRAS and other feature servers. However, achieving the three basic requirements of: (1) directing subscriber traffic to a given feature server depending on the requested service; (2) identifying the subscriber at the feature server; and (3) directing feature server traffic to a given subscriber in the reverse direction—all without any ambiguity—has proven difficult.

According to one proposal, Dynamic Host Configuration Protocol (DHCP) relay agents or Point-to-Point over Ethernet (PPPOE) intermediate agents are incorporated into the network edge device, e.g., the DSLAM or Ethernet access switch. (PPPOE is a specification for connecting Ethernet users to the Internet through a common broadband medium such as a DSL.) In this approach, the Ethernet edge device provides the DHCP server or Remote Authentication Dial-In User Service/Authentication, Authorization and Accounting (RADIUS/AAA) server with the same information it would normally receive from a BRAS DHCP relay agent or from a BRAS RADIUS client function in an ATM network. Although this proposal solves the problem of identifying the subscriber at the feature server, it fails to satisfy the other two requirements listed above.

In another proposal, the edge device translates the source MAC address of the subscriber packets into a new MAC address encoded with a DSLAM ID and line ID. This translation is performed such that the resultant MAC address is unique within the service provider network. When the packet is received by the feature server, the subscriber ID is extracted from the source MAC address. This proposal, however, suffers from several drawbacks that include limited DSLAM ID and port ID space, problems with reverse mapping of the provider MAC address to a subscriber MAC address, and security issues. Additionally, this approach is inadequate for multipoint applications where a separate broadcast domain (e.g., separate VLAN) is needed per service instance.

Thus, what is needed is an alternative system and method for data communications between DSLAM devices and feature servers over an Ethernet network that overcomes the shortcomings of past approaches.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A DSL network VLAN bundling mechanism that provides DSL subscriber identification over an Ethernet network, and which further provides feature server selection and forwarding of subscriber traffic to a given feature server, and in the reverse direction forwarding traffic back to a given subscriber without ambiguity, is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Figure 4:
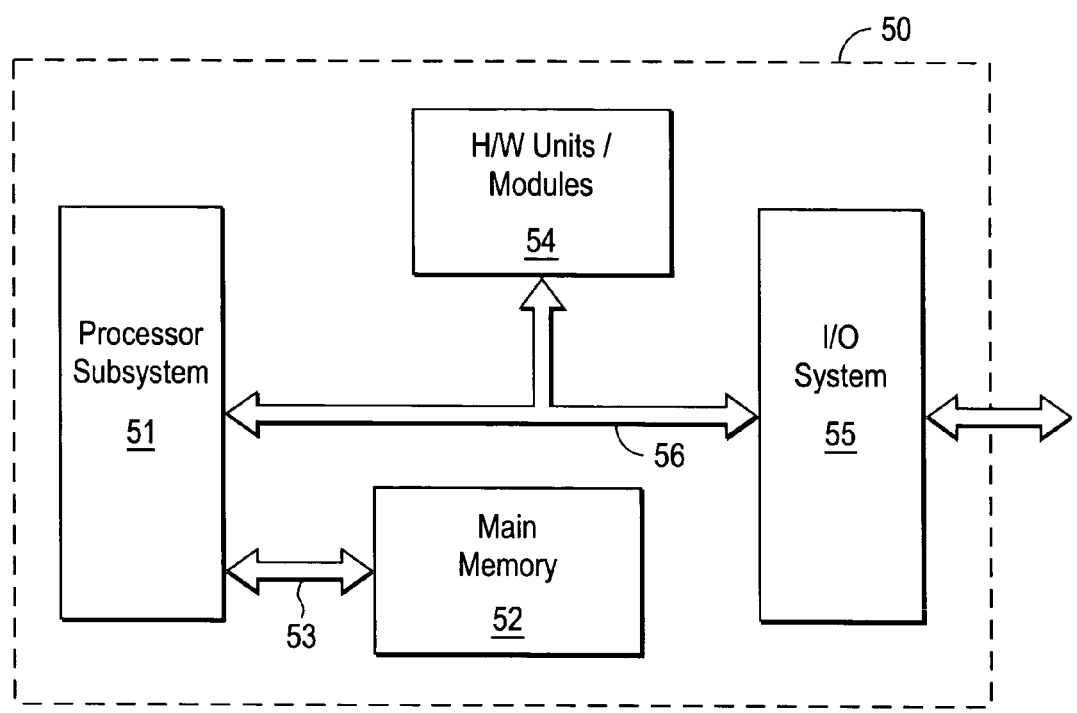
FIG. 4 is a generalized circuit schematic block diagram of a network node.

As shown in FIG. 4, each node 50 typically comprises a number of basic subsystems including a processor subsystem 51, a main memory 52 and an input/output (I/O) subsystem 55. Data is transferred between main memory ("system memory") 52 and processor subsystem 51 over a memory bus 53, and between the processor and I/O subsystems over a system bus 56. Examples of the system bus may include the conventional lightning data transport (or hyper transport) bus and the conventional peripheral component [computer] interconnect (PCI) bus. Node 50 may also comprise other hardware units/modules 54 coupled to system bus 56 for performing additional functions. Processor subsystem 51 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

The present invention leverages the frame format and some of the functionality defined in the proposed IEEE 802.1 ad specification that supports the so-called "Q-in-Q" encapsulation (also known as VLAN bundling or tag stacking) mechanism. According to this draft standard, each data packet includes an upper (i.e., outer) 12-bit VLAN tag and a lower (i.e., inner) 12-bit VLAN tag. In accordance with one embodiment of the present invention, the inner VLAN tag is used to identify the customer or subscriber, and the outer VLAN tag is utilized to specify the DSLAM and feature server pair.

Figure 1:
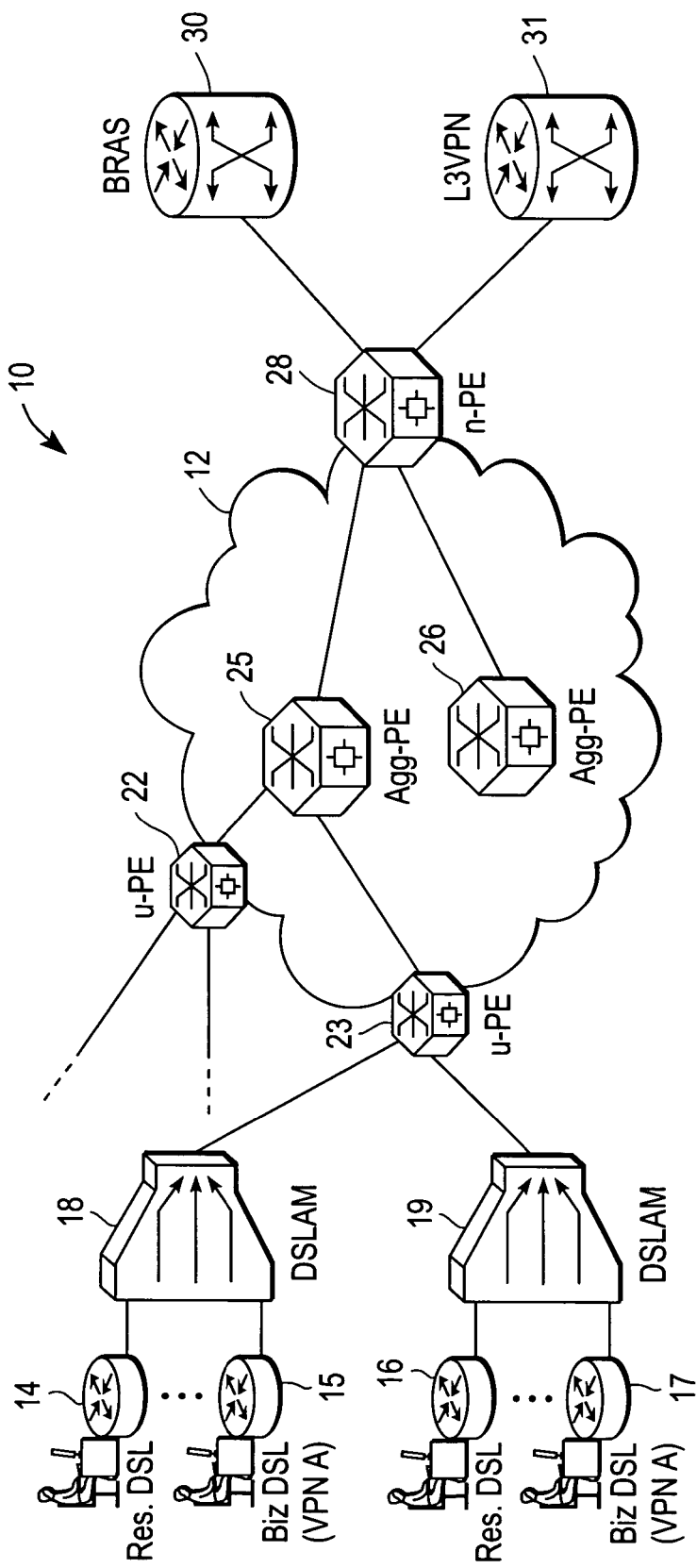
FIG. 1 is a diagram showing a network topology according to one embodiment of the present invention.

FIG. 1 is a diagram showing a DSLAM access/aggregation network topology 10, which includes and Ethernet access network 12 with user-facing provider edge (u-PE) devices 22 & 23 connected to a network-facing provider edge (n-PE) device 28 through one or more bridges or switches 25 & 26, also frequently referred to as provider edge aggregation (Agg-PE) devices. (In the context of the present application, the terms "bridge" and "switch" are considered synonymous.) The left-hand side of FIG. 1 shows a plurality of DSLAMs (e.g., devices 18 & 19) coupled to u-PE device 23. Each DSLAM aggregates a plurality of customers or subscribers. For example, customer edge (CE) devices 14 & 15 (respectively representing residential DSL subscriber 14 and business DSL subscriber 15) are shown connected to the input ports of DSLAM 18. Similarly, customer edge (CE) devices 16 & 17 are shown connected to DSLAM 19. On the right-hand side of FIG. 1 n-PE device 28 is shown connected to a plurality of service nodes, which include BRAS server 30 and L3VPN server 31.

Figure 2:
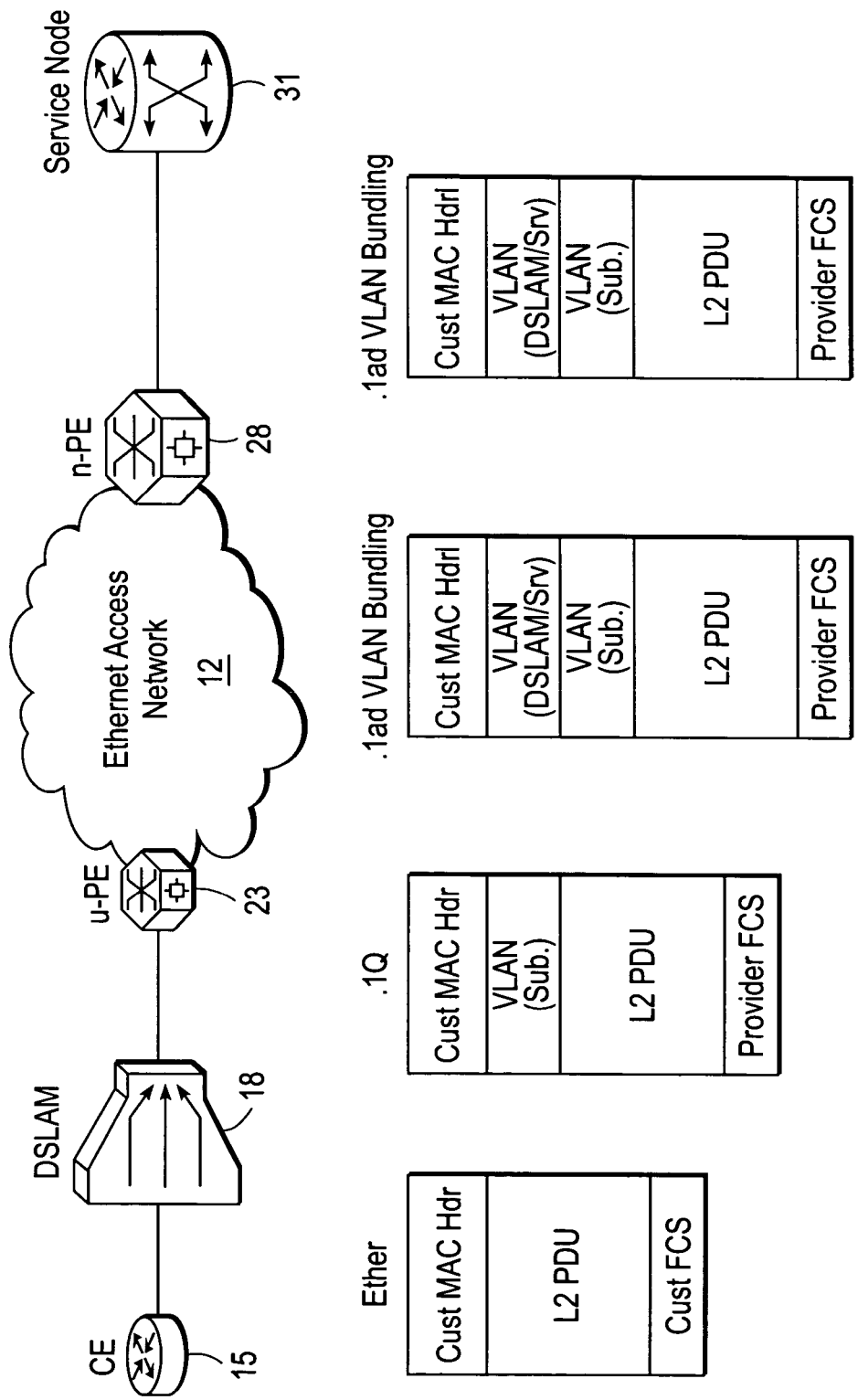
FIG. 2 illustrates a VLAN bundling model in accordance with one embodiment of the present invention.

FIG. 2 illustrates the concept of VLAN bundling in accordance with one embodiment of the present invention. The top portion of FIG. 2 shows a path from CE device 15 to feature server 31, which path passes through DSLAM 18, u-PE device 23, Ethernet access network 12, and n-PE device 28. Data packet format diagrams are shown under each corresponding network connection.

In the example of FIG. 2, VLAN bundling functionality is performed by the edge switch (i.e., u-PE device 23), with a processor of DSLAM 18 mapping the subscriber VLAN (line-id) and the requested service type into an IEEE 802.1q VLAN tag. As is well known, the IEEE 802.1q specification defines a standard for inserting Virtual Local Area Network (VLAN) information into Ethernet frames. For example, according to the existing standard, a 12-bit tag that uniquely identifies the subscriber VLAN is inserted into an Ethernet frame at DSLAM 18. Thereafter, the customer frame sent by CE device 15 arrives at u-PE device 23 with a data packet format consistent with the IEEE 802.1q specification, which format includes a customer MAC header, a subscriber VLAN tag, a Layer 2 protocol data unit (L2PDU) payload, and a service provider Frame Check Sum (FCS).

In the exemplary embodiment of FIG. 2, u-PE device 23 is a standard IEEE 802.1ad switch that adds an outer VLAN tag which specifies the DSLAM/feature server connection. In other words, the outer VLAN tag identifies the pair of DSLAM and feature server devices (e.g., devices 18 & 31) so that data packets always arrive at the correct network destination. The inner VLAN tag identifies the subscriber, which, in the present example, is utilized to identify the subscriber connected through CE device 15, as distinguished from the residential subscriber connected to CE device 14.

Practitioners in the networking arts will appreciate that since a unique VLAN (outer tag) is used to uniquely identify a DSLAM and feature server pair, the data traffic in the forward direction (i.e., from left-to-right in FIG. 2) gets forwarded only to the specified feature server. The same is true in the reverse direction. When the frame arrives at feature server 31, the subscriber line-id may be determined by examination of the inner VLAN tag. Furthermore, since a unique outer VLAN tag is used per DSLAM/server pair, a separate broadcast domain is used per DSLAM/server pair across access network 12, thereby avoiding potential conflicts that might otherwise occur when subscribers' MAC addresses on different DSLAMs overlap. Moreover, since a unique inner VLAN tag is utilized within each DSLAM, any potential conflict from overlapping subscribers' MAC addresses within a given DSLAM is similarly avoided.

Those of skill in the networking arts will understand that the IEEE 802.1p specification enables Layer 2 switches to prioritize traffic and perform dynamic multicast filtering. The prioritization specification works at the media access control (MAC) framing layer (i.e., Open Systems Interconnection model Layer 2). In accordance with another embodiment of the present invention, the limitation of 4,094 DSLAM/feature server pairs imposed by the 12-bit VLAN tag field may be extended through the use of the 802.1p bits. In this embodiment, the DSLAM adds the inner tag to represent the subscriber line-id only, with the service type being reflected in the 802.1p bits. The edge switch (e.g., u-PE device 23) uses this combination of both 802.1q (VLAN id) and 802.1p bits to determine the outer VLAN tag, thereby increasing to 32K the total number of DSL subscribers/requested service connections that can be supported (i.e., 4K subscriber lines with each line supporting up to 8 different services.) In this case, the outer VLAN tag still represented the associated DSLAM and requested service as before.

Figure 3:
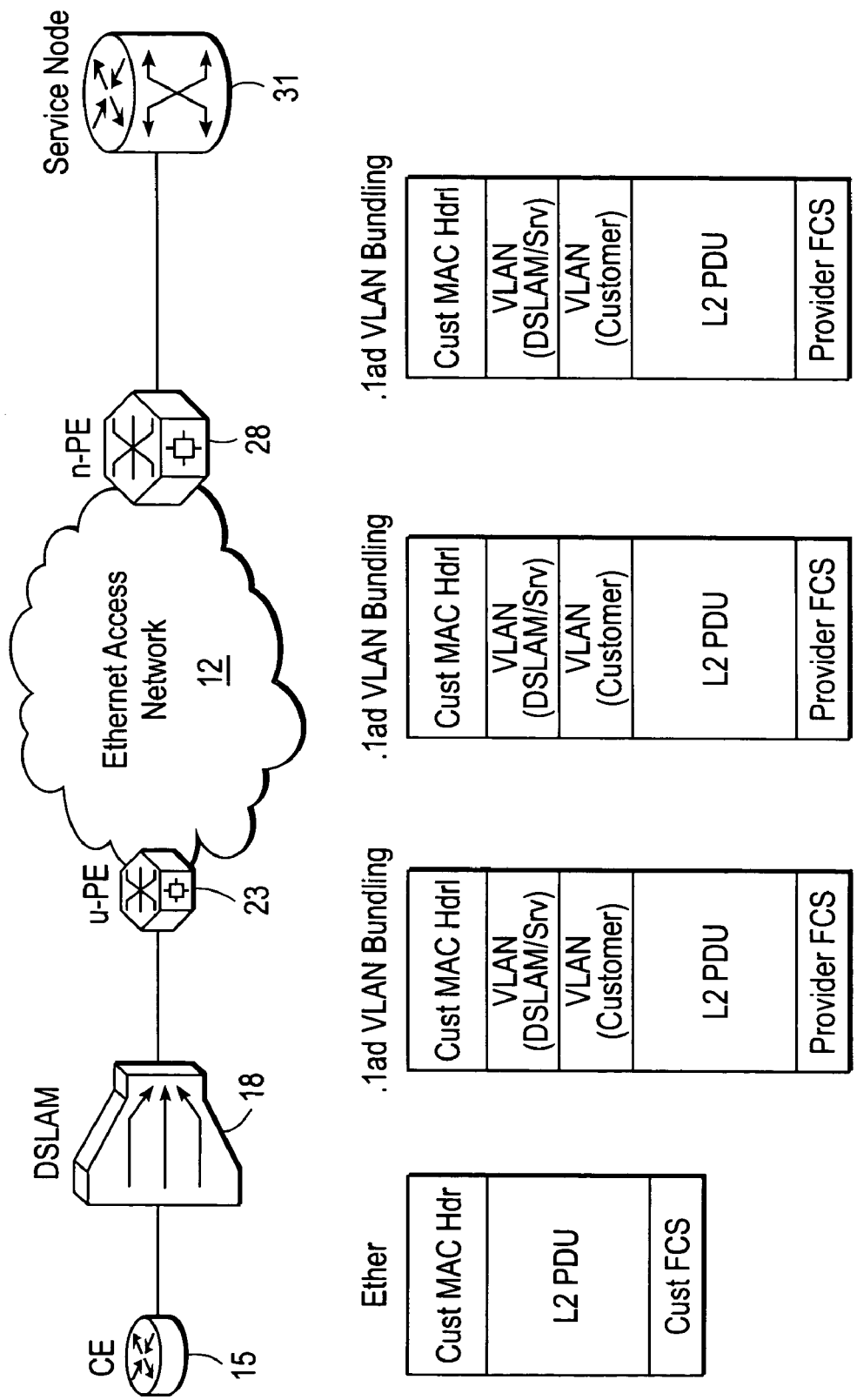
FIG. 3 illustrates a VLAN bundling model in accordance with another embodiment of the present invention.

FIG. 3 illustrates a VLAN bundling model in accordance with another embodiment of the present invention in which VLAN bundling is performed at the DSLAM edge device, e.g., DSLAM 18. Note that this embodiment is essentially the same as that shown in FIG. 2, except that the functionality for adding the outer VLAN tag previously performed by u-PE device 23 is now performed by DSLAM 18. That is, DSLAM 18 is configured to perform IEEE 802.1ad bundling, wherein DSLAM 18 adds first and second VLAN tags to the customer frame. The first VLAN tag identifies the Digital Subscriber Line (DSL) subscriber, and the second VLAN tag identifies the DSLAM/feature server pair.

Note that in the embodiment of FIG. 3, if ATM encapsulation of frames is used between CE device 15 and DSLAM 18, then an ATM VC (VPI/VCI) is mapped to the inner VLAN tag of the IEEE 802.1ad frame, and the outer VLAN tag represents the DSLAM and the selected service on that DSLAM. For instance, if the ATM VC is associated with a particular data service, then the outer VLAN tag represents both the associated DSLAM as well as the data service type.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred to a node or switch by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

I claim:

1. A processor-implemented method of operation for a user-facing provider edge (u-PE) device of a Service Provider (SP) Ethernet access network that operates consistent with an IEEE 802.1ad specification, the method comprising:

receiving a packet from a Digital Subscriber Line Access Multiplexer (DSLAM) device, the packet including a subscriber Virtual Local Area Network (VLAN) tag that identifies a Digital Subscriber Line (DSL) subscriber, the packet having a format consistent with an IEEE 802.1q specification; and adding an outer VLAN tag to the packet, thereby creating a modified packet with the subscriber VLAN tag comprising an inner VLAN tag, the outer VLAN tag uniquely identifying a pair of devices consisting of the DSLAM and a destination server coupled to the SP Ethernet access network such that a separate broadcast domain is provided for the pair of devices across the SP Ethernet access network, the modified packet having a format consistent with the IEEE 802.1ad specification, wherein forwarding of data packets over the SP Ethernet access network is based solely on the outer VLAN tag.

2. The processor-implemented method of claim 1 wherein the format of the packet includes a customer MAC header, the subscriber VLAN tag, a Layer 2 protocol data unit (L2PDU) payload, and a service provider Frame Check Sum (FCS).

3. The processor-implemented method of claim 1 wherein the format of the modified packet includes a customer MAC header, the outer VLAN tag, the inner VLAN tag, a Layer 2 protocol data unit (L2PDU) payload, and a service provider Frame Check Sum (FCS).

4. A processor-implemented method of operation for a Digital Subscriber Line Access Multiplexer (DSLAM) device coupled to a Service Provider (SP) Ethernet access network that operates consistent with an IEEE 802.1ad specification, comprising:

receiving a customer frame from a customer edge (CE) device;

performing Virtual Local Area Network (VLAN) bundling to create a modified frame consistent with an IEEE 802.1ad specification by adding inner and outer VLAN tags to the customer frame, the inner VLAN tag identifying a Digital Subscriber Line (DSL) subscriber, and the outer VLAN tag specifying a connection between a pair of devices consisting of the DSLAM device and a feature server coupled to the SP Ethernet access network such that a separate broadcast domain is provided for the pair of devices across the SP Ethernet access network, wherein forwarding of data packets over the SP Ethernet access network is based solely on the outer VLAN tag consistent with the IEEE 802.1ad specification.

5. The processor-implemented method of claim 4 wherein after VLAN bundling the modified frame has a packet format that includes a customer MAC header, the outer VLAN tag, the inner VLAN tag, a Layer 2 protocol data unit (L2PDU) payload, and a service provider Frame Check Sum (FCS).

6. A processor-implemented method of operation for a Digital Subscriber Line Access Multiplexer (DSLAM) device coupled to a Service Provider (SP) Ethernet access network that operates consistent with an IEEE 802.1ad specification, comprising:
receiving an Asynchronous Transfer Mode (ATM) subscriber frame from a customer edge (CE) device;
performing Virtual Local Area Network (VLAN) bundling to create a modified frame consistent with an IEEE 802.1ad specification by adding inner and outer VLAN tags to the ATM subscriber frame, the inner tag mapping an ATM Virtual Circuit (VC) and the outer VLAN tag identifying a pair consisting of the DSLAM device and a data service type such that a separate broadcast domain is provided for the pair across the SP Ethernet access network, wherein forwarding of data packets over the SP Ethernet access network is based solely on the outer VLAN tag consistent with the IEEE 802.1ad specification.

7. The processor-implemented method of claim 6 wherein after VLAN bundling the modified frame has a packet format that includes a customer MAC header, the outer VLAN tag, the inner VLAN tag, a Layer 2 protocol data unit (L2PDU) payload, and a service provider Frame Check Sum (FCS).

8. A user-facing provider edge (u-PE) device for association with a Service Provider (SP) Ethernet access network that operates consistent with an IEEE 802.1ad specification, the u-PE device comprising:
a port to receive a packet from a Digital Subscriber Line Access Multiplexer (DSLAM) device, the packet including a subscriber Virtual Local Area Network (VLAN) tag that identifies a Digital Subscriber Line (DSL) subscriber, the packet having a format consistent with an IEEE 802.1g specification; and
a processor that adds an outer VLAN tag to the packet, thereby creating a modified packet with the subscriber VLAN tag comprising an inner VLAN tag, the outer VLAN tag identifying a pair of devices consisting of the DSLAM and a feature server coupled to the SP Ethernet access network such that a separate broadcast domain is provided for the pair of devices across the SP Ethernet access network, the modified packet having a format consistent with the IEEE 802.1ad specification, wherein forwarding of data packets over the SP Ethernet access network is based solely on the outer VLAN tag.

9. The u-PE device of claim 8 wherein the format of the packet includes a customer MAC header, the subscriber VLAN tag, a Layer 2 protocol data unit (L2PDU) payload, and a service provider Frame Check Sum (FCS).

10. The u-PE device of claim 8 wherein the format of the modified packet includes a customer MAC header, the outer VLAN tag, the inner VLAN tag, a Layer 2 protocol data unit (L2PDU) payload, and a service provider Frame Check Sum (FCS).

11. A Digital Subscriber Line Access Multiplexer (DSLAM) device for connection to a Service Provider (SP) Ethernet access network that operates consistent with an IEEE 802.1ad specification, comprising:
a port to receive a customer frame from a customer edge (CE) device; and
a processor that performs Virtual Local Area Network (VLAN) bundling to create a modified frame consistent with an IEEE 802.1ad specification by adding inner and outer VLAN tags to the customer frame, the inner VLAN tag identifying a Digital Subscriber Line (DSL) subscriber, and the outer VLAN tag specifying a connection between a pair of devices consisting of the DSLAM device and a feature server coupled to the SP Ethernet access network such that a separate broadcast domain is provided for the pair of devices across the SP Ethernet access network, wherein forwarding of data packets over the SP Ethernet access network is based solely on the outer VLAN tag.

12. The DSLAM device of claim 11 wherein after VLAN bundling the modified frame has a packet format that includes a customer MAC header, the outer VLAN tag, the inner VLAN tag, a Layer 2 protocol data unit (L2PDU) payload, and a service provider Frame Check Sum (FCS).

13. A provider edge device for association with a Service Provider (SP) Ethernet access network that operates consistent with an IEEE 802.1ad specification, the provider edge device comprising:
a port to receive a packet from a Digital Subscriber Line Access Multiplexer (DSLAM) device, the packet including a subscriber Virtual Local Area Network (VLAN) tag that identifies a Digital Subscriber Line (DSL) subscriber, the packet having a format consistent with an IEEE 802.1q specification; and
means for adding an outer VLAN tag to the packet, thereby creating a modified packet with the subscriber VLAN tag comprising an inner VLAN tag, the outer VLAN tag identifying a pair of devices consisting of the DSLAM and a feature server coupled to the SP Ethernet access network such that a separate broadcast domain is provided for the pair of devices across the SP Ethernet access network, wherein forwarding of data packets over the SP Ethernet access network is based solely on the outer VLAN tag.

14. A Service Provider (SP) Ethernet access network that operates consistent with an IEEE 802.1ad specification, comprising:
a user-facing provider edge (u-PE) device configured to receive a packet from a Digital Subscriber Line Access Multiplexer (DSLAM) device, the packet including a subscriber Virtual Local Area Network (VLAN) tag that identifies a Digital Subscriber Line (IDSL) subscriber, the packet having a format consistent with an IEEE 802.1q specification, the u-PE device including means for adding an outer VLAN tag to the packet, thereby creating a modified packet with the subscriber VLAN tag comprising an inner VLAN tag, the outer VLAN tag identifying a pair of devices consisting of the DSLAM and a destination server coupled to the SP Ethernet access network such that a separate broadcast domain is provided for the pair of devices across the SP Ethernet access network, the modified packet having a format compliant with an IEEE 802.1ad specification;
a plurality of intermediate nodes configured to forward the modified packet over the SP Ethernet access network based solely on the outer VLAN tag; and
a network-facing provider edge (n-PE) device configured to forward the modified packet with the outer VLAN tag to the destination server.

* * * * *